United States Patent [19]

Scherber et al.

[11] Patent Number: 4,887,890
[45] Date of Patent: Dec. 19, 1989

[54] CONTROLLED TRANSPARENCY

[75] Inventors: Werner Scherber, Bermatingen; Thomas Meisel, Meersburg, both of Fed. Rep. of Germany

[73] Assignee: Dornier System GmbH, Friedrichshafen, Fed. Rep. of Germany

[21] Appl. No.: 135,595

[22] Filed: Dec. 21, 1987

[30] Foreign Application Priority Data

Dec. 20, 1986 [DE] Fed. Rep. of Germany ....... 3643690

[51] Int. Cl.⁴ ............................................... G02F 1/17
[52] U.S. Cl. .................................................... 350/357
[58] Field of Search ......................... 350/357, 353, 355

[56] References Cited

U.S. PATENT DOCUMENTS

| | | | |
|---|---|---|---|
| 4,304,465 | 12/1981 | Diaz | 350/357 |
| 4,573,768 | 3/1986 | Polak et al. | 350/357 |
| 4,586,792 | 5/1986 | Yang et al. | 350/357 |

OTHER PUBLICATIONS

Svensson et al., "Electrochromic Coatings for 'Smart Windows'", *SPIE* vol. 502, *Optical Materials Technology For Energy Efficiency and Solar Energy Conversion III* (1984).

Raul et al., "Material for Electrochromic Windows", SPIE vol. 502, *Optical Materials Technology For Energy Efficiency and Solar Energy Conversion III* (1984).

*Primary Examiner*—Eugene R. Laroche
*Assistant Examiner*—Nathan W. McCutcheon
*Attorney, Agent, or Firm*—Ralf H. Siegemund

[57] ABSTRACT

Pane or foil with controllable transparency and light transmission comprises a layer configuration between two transparent carriers such as glass panes, foils or the like; transparent electrodes are disposed on the carriers; a tansparent electrolyte and an active polymer layer are disposed between the electrodes; the active polymer layer has light absorption in the visible spectrum range characterized by a variation in the case of a reversible chemical doping reaction; preferably an additional transparent layer is included to serve as reversible source for storage and yielding of ions, the additional layer is juxtaposed to the electrolyte.

11 Claims, 1 Drawing Sheet

CONTROLLED TRANSPARENCY

BACKGROUND OF THE INVENTION

The present invention refers to a pane, foil or the like with controllable light transmissivity.

Certain phototropic glass blends and related kinds of gases are presently used in conjunction with spectacles. However, in other fields e.g. vehicle windows are at present not constructed for controlled transparency. Moreover, the transmission that is being controlled i.e. the range of control is fairly small. Building windows have not been constructed in that fashion and are darkened since time immemorial by means of drapes, blinds, shutters or other movable mechanical devices.

DESCRIPTION OF THE INVENTION

It is an object of the present invention to provide a new and improved pane and/or foil with controllable light transmissivity whereby the transmission is not to be controlled by mechanical, diaphragm or light blocking, opaque devices.

In accordance with the preferred embodiment of the present application, it is suggested to provide at least one glass pane or flexible foil coated on one side with a transparent semiconductor electrode being in contact with an active polymer layer on which has been deposited a highly transparent electrolyte which in turn carries another transparent electrode. For reasons of safety, the latter may be deposited on another glass pane, foil or the like, so that the layer configuration is in fact sandwiched between two glass panes, other transparent panes or foils. Thus it is suggested, in accordance with the preferred embodiment of the present invention, to provide two transparent carriers for respective transparent electrodes on the carriers, a transparent electrolyte as well as an active polymer between the electrodes; the polymer having an absorption for radiation that is active in the visible spectrum and subject to change through a reversible chemical reaction; the reaction being electrochemical doping. In addition, there may be a transparent ion source and storage layer for purposes of providing and storing ions needed for the doping.

Preferably, the electrodes each have a thickness between 1/10 and ½ micrometers. The polymer layer is preferably between 5 and 10 micrometers thick and the ion source layer is preferably between 2 and 5 micrometers thick. Preferably the electrodes are made either from $In_2O_3:SnO_2(=ITO)$; $SnO_2;In_2O_3;Mo$; Pd; Pt; Rh; Ti; ZnSe or other transparent semiconductors. The polymer layer can be polyaniline, polyaniline-3-sulfonic acid, poly-O-phenyldiamine, polypyrol, polythiophene and others. The electrolyte is preferably a polymeric sulfonic acid; a polymeric carbonic acid; buffered $H_2SO_4$; HCl or buffered $HClO_4$. The ion source and storage layer may be polyaniline, Pd, Pt, Rh, Ti, Mo, or ITO.

The invention uses an electrooptical layer system on the basis of an electrically conductive polymer. Owing to their chemical persistance, their cyclic strength and clear transparency they are well suited to serve as controllable windows. The control mechanism is based on the reversible process of electrochemically doping certain polymer substances which results in rather strong color changes e.g. running from colorless to yellow, green, blue and black. The polymer is located between the two electrodes together with an electrolyte that is either a catalyst solid, thin foil, liquid or a paste and is controlled through appropriate voltages as applied to the electrodes. Since the color change is accompanied by a change in electrical conductivity of the cell the actual switch state can easily be controlled for purposes of redundancy as well as automatic control. It is preferred to use a polymer layer as an active element and this as well as the carrier foil or pane constitute a unit such that the overall geometry in terms of shape, curvature, stiffness, flexibility and so forth can be freely selected based on the appropriate properties and requirements for the carrier. Owing to the thinness of the various layers they do not interfere with these mechanical properties at all.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding to the detailed description of the drawings, FIGS. 1a and 1b show two glass panes 1 and 2 being transparent carriers for semiconductive electrodes 3 and 4. These electrodes are quite thin as stated above (between 0.1 and 0.5 micrometers) so that even in the case of metal they are in fact transparent on account of their thinness. These two electrodes 3 and 4 sandwich between them an active polymer layer 5 and a highly transparent electrolyte 6. In effect, the layer 5 has been deposited on electrode 3 and electrolyte 6 serves as a bonding agent to connect the system 1,3 to the system 2,4,6. Depending on the polarity of any voltage applied, the value thereof or even mere absence of any voltage between the electrodes, polymer 5 is clear and transparent, opaque or in between, i.e. partially transparent or translucent. The color determining oxidation condition of the conductive polymer is defined through the pH value of the buffered polymer electrolyte.

By applying a suitable potential below the decomposition voltage of the electrolyte to the two electrodes 3 and 4, the conductive polymer 5 is reduced through the injection of protons or upon reversing the polarity protons (ions) are yielded and the substance and oxidizes. Consequently, decolorization on one hand and coloring of the polymer on the other hand obtains. As long as the requisite holding potential is applied to the system, i.e. the electrodes 3 and 4 the respective color and absorption level is retained. The electric current consumption is extremely low in order to maintain this holding state. Should the potential value drop then the system reverts to the initial state. Instead of just having the potential drop, one may have a temporary polarity reversal for accelerating the process of transmissivity change.

Figures 1A, 1B:
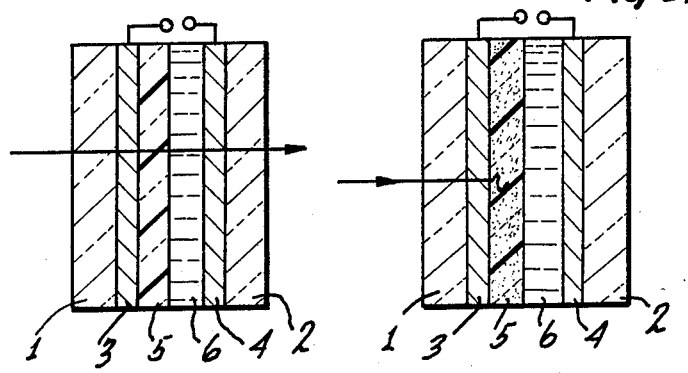
FIGS. 1a and 1b are cross sections through a first embodiment of the present application for practicing the best mode thereof, the two figures differ in operating states.
Figures 2A, 2B:
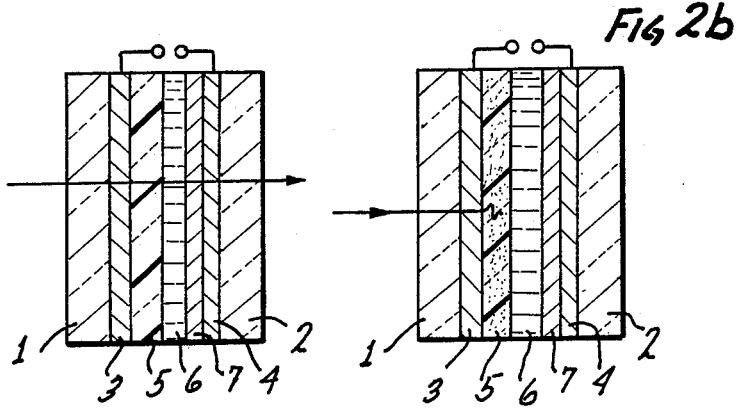
FIGS. 2a and 2b are similar cross sections through a modified example for practicing the preferred embodiment in accordance with the best mode principles and the figures again differ as to the operating state.

FIGS. 2a and 2b illustrate as stated another example of the preferred embodiment. The layer configuration is essentially similar to the one shown in FIGS. 1a and 1b but there is interposed another layer 7. This layer is a proton store and abuts the electrode 4. This way one obtains a potential free storage in accordance with the respective state of colorization. The layer 7 has to be transparent. The protons necessary for control will be stored in the form of absorbing or a hydride under utilization of a thin transparent metal or semiconductive layer.

The coloring reaction in the case of a conductive polyaniline and its derivatives is combined with oxidation under yielding of protons of the amino-group. The reaction is as follows.

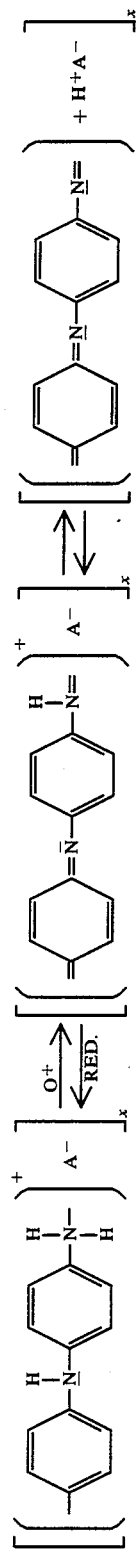

The color of polyaniline is green (or yellow depending upon the electrolyte and the pH value) for 0 volts and changes into dark blue for +0.4 volts and into black at +0.8 volts. Upon applying a negative potential there is a reduction and a proton acceptance and here the polymer will become completely transparent. This condition obtains at about −0.2 volts and below.

Derivatives of polyaniline exhibit similar properties except that the colors differ. The saturation colors of the oxidized substance are purple, violet or dark green. If the system is operated above the decomposition voltage of the electrolyte one obtains hydrogen at the respective negative electrode. For polymer sulfonic acid with a particular, well defined $H_2O$ content the following equation obtains:

$$H_2 + H_2O \underset{CATHODE}{\overset{ANODE}{\rightleftarrows}} 2H_3O^+ + e^-$$

The hydrogen in this case can be bonded to the electrodes by means of adsorption or under formation of hydrides. This way any development of gas is avoided. On reversing the polarity the electrode will yield hydrogen.

Suitable electrode materials are, as stated above, Pd, Pt, Rh or Ti in a thin transparent state. One can also use semiconductive transparent material, such as stated above $In_2O_3$: $SnO_2$(ITO). These electrodes do store hydrogen to some extent.

$$Me + H_2 \rightleftarrows Me(H_{2ad})$$

or $$2Me + H_2 \rightleftarrows 2Me(H)$$

Suitable, electrically conductive polymers are, for example, polyaniline, poly-O-phenyldiamine, poly-O-aniline-3-sulfonic acid, polypyrol and polythiophene. The polymer is produced through anodic oxidation of the respective monomer using an acidic electrolyte. One produces in this case on the electrode an insolvable polymer which polymer remains consistent and persistent in acid as well as base solutions and precipitates in rather thin film. Through suitable election of the conductive salts (anion of the polymer) within the polymerization solution one can control the colorization of the polymer.

In the general description of the invention above, other suitable materials were mentioned as well as the preferred layer thicknesses as applied to the the layers as depicted.

In the following various fields of employment are being discussed in detail to some extent.

VEHICLE WINDOWS

The window panes in vehicles should be made in accordance with the invention. They can be used as visors and protection in cars, across a sun-roof but also for the front (windshield) and rear windows, as side windows and even as entire transparent roofs (bubbles). Through an automatic reversal in the transparent state on zero voltage one provides other important safety aspects for automobiles; in case of electric failure e.g. the windows turn clear and transparent. Hence there will be no impediment as far as visibility as far as the windows are concerned.

Other safety features can be obtained through partial darkening of the windshield in that the upper part of the pane there being separately controlled for blocking to some extent the radiation of the sun. The degree of darkening may be obtained and varied in zones, i.e. in steps or on a continuous basis. It may well be advisable to provide customized variations in accordance with particular desires and physiology of the driver. Also the situation changes with the height of the sun (time of day and season) as well as with the uniqueness of the driving situations. The darkening control may be integrated into a computer controlled system of the vehicle.

The figures of the drawings show specifically integration of the transparency control into a compound multi-element window pane. The transparency of the window may be manually controlled through manual control of switches, resistors etc. or automatically. Particularly and for example in the case of night driving it may be advisable to have a rather rapid response to protect the driver against the blinding effects of oncoming high beam light or the like. Also, the transparency level of the windows should be readily adaptable in situations such as entering or exiting from a tunnel, garages or the like. Certain protective aspects are involved as far as braking and theft are concerned. If the windows are left completely dark a would-be thief cannot see whether there is something worth stealing in the interior of the car. Darkening of the windows in an automated fashion may also prevent undue heating of the interior of the vehicle particularly when parked.

BUILDINGS

Windows for buildings may include inventive panes which permit readily adaptation of the illumination of rooms to ambient conditions. The windows of living rooms, work areas, green houses etc. may be controlled against excess sun and protected against intruding inspection. In order to minimize the danger of burglary, the window panes in banks, shops can be darkened rapidly by pushing a button. Also, glass doors can be made automatically visible on approach by a person. They may become partially opaque in a particular color as a warning to the approaching person not to run into the door.

Basically, one has to consider the fact that all of the various colors used can be produced. This is a feature which permits architectonic integration of these colorable window panes into the facade of a building. It should also be noted that no matter how large these windows the energy consumption still remains very low. Particularly if one uses the ion storage type system shown in FIG. 2a, 2b any energy that is consumed is needed only for switching and changing, not for maintaining the status quo. It should be said that a typical power requirement for a single switching operation is about 0.3 $Wh/m^2$.

SOLAR ENERGY

Figure 3:
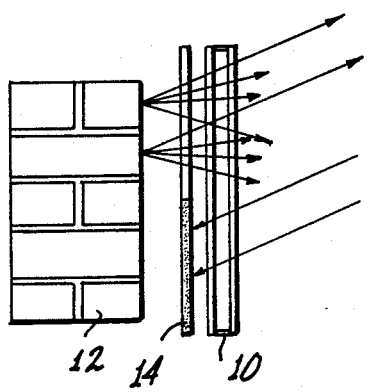
FIG. 3 is a cross section through a wall insulation for a building using the invention in accordance with the preferred embodiment adapted for building and construction use.

FIG. 3 illustrates an example for practicing the invention wherein the absorption of solar radiation is used for controlling the heat balance as it passes through the outer surfaces of buildings. On one hand there is a heat insulating glass cover 10 and a brick wall e.g. 12 and in between there is provided a switchable composite element 14 constructed in accordance with the principles of the invention (FIGS. 1a,b; 2a,b). When transparent as far as the upper half is concerned, incident solar radiation is diffusedly reflected as indicated by the arrows 15;

the wall 12 may be painted white. Only a small portion of the visible radiation is converted into thermal energy.

As far as the lower part is concerned, the active element 14 will in fact absorb solar energy to a considerable extent and convert this energy into heat. Radiation, convection and/or conduction through physical contact with the brick wall causes the absorbed thermal energy to flow into the building. The figures shows also a double insulating glass pane 10 in front of the element 14. That double pane glass window 10 by itself may be somewhat less economical to use but has a higher efficiency than a single glass pane. In either case the loss of heat through infrared radiation or conduction into the environment is avoided. Of course the wall is only an example; one can use other kinds of walls which as far as thermal balance is concerned; also the invention can be used in completely different types and kinds of construction devices such as water tanks, heat exchangers, solar cells and the like.

INDICATION

It can be seen that owing to the large variety of colors available the respective pane can be made attractive as far as the possible color employed is concerned. Owing to the large areal coverage of practicing the invention, all kinds of different contours can be used and the field of employment is by no means tied to a planar configuration. The known structural technology for electrodes 3 and 4 can readily be used particularly on account of the thin layer configuration. This thin layer configuration as proposed can readily be adapted to any kind of contours. In fact, there is available an element that is highly suitable for purposes of advertising, decoration or the like.

The system in accordance with the invention is disposed between and is carried by glass panes but in the alternative one can use one or two transparent foils made of rigid or flexible synthetic material. This way one may in fact provide posterlike information sources with variable information. Also, the invention can be used for small scale indication such as dials and watches, measuring instruments, in display panels, traffic signs, image screens of different sizes, advertisement boards, panels in airports, train stations or the like.

It can be seen that the invention is applicable in this broad sense wherever it is acceptable that there is a delay in the control command and the visible response, that delay may be in the order of a few seconds. Of course, the invention is also practical in the field of optics or glasses, lenses, filters etc.

The invention is not limited to the embodiments described above but all changes and modifications thereof, not constituting departures from the spirit and scope of the invention, are intended to be included.

What is claimed is:

1. Pane or foil with controllable transparency and light transmission comprising:
   at least one transparent carrier;
   a first and a second transparent electrode; said first electrode being disposed on said one carrier;
   a transparent electrolyte and an active polymer layer disposed on said first electrode, said active polymer layer having a light absorption in the visible spectrum range characterized by a variation in the case of a reversible chemical reaction being an electrochemically induced doping process;
   a transparent ion layer made of ITO and being disposed such that the electrolyte is situated between the ion layer and the active polymer layer, the ion layer serving as a reversible ion receiving and ion storage layer as well as a yielding source for ions respectively to receive such ions from the polymer layer and to provide such ions to the polymer layer; and
   said second electrode being disposed so that the electrolyte and the polymer layer is between the electrodes.

2. Pane or foil in accordance with claim 1 comprising layer thicknesses as follows:
   said electrodes each having a thickness between 1/10 and ½ micrometers;
   said polymer layer having a thickness between 1-10 micrometers;
   said transparent ion layer having a thickness between 2 to 5 micrometers; and
   said electrolyte having a thickness between 5-10 micrometers.

3. Pane or foil in accordance with claim 1 wherein said electrodes are one of the following:
   $SnO_2$: $In_2O_3$; $SnO_2$; $In_2O_3$; Mo; Pt; Pd; Rh; Ti; ZnSe.

4. Pane or foil in accordance with claim 1 said polymer layer being either polyaniline; polyaniline-3-sulfonic acid; polypyrol; polythiophene or poly-O-phenyl diamine.

5. Pane or foil in accordance with claim 1 said electrolyte being one of the following: a polymeric sulfonic acid; a polymeric carbonic acid; buffered $H_2SO_4$; HCl; buffered $H_2ClO_4$.

6. Rigid or flexible panel with controllable transparency and light transmission comprising:
   two transparent carriers;
   a first and a second transparent electrode respectively deposited on said carrier;
   a transparent electrolyte and an active polymer layer disposed between said electrodes, said active polymer layer having a light absorption in the visible spectrum range characterized by a variation in the case of a reversible chemical reaction through reversible doping: and
   an ITO layer also being transparent and serving as reversible source for storage and yielding of ions so that the electrolyte is between the ITO layer and the polymer layer and being disposed to provide said ions or receiving them from said polymer layer.

7. Panel in accordance with claim 6 comprising layer thicknesses as follows:
   said electrodes each having a thicknesses between 1/10 and ½ micrometers;
   said ion storing and yielding layer interposed in juxtaposition to said electrolyte and having a thickness between 2-5 micrometers;
   said polymer layer having a thickness between 1-10 micrometers; and
   said electrolyte having a thickness between 5-10 micrometers.

8. Panel in accordance with claim 6 wherein said electrodes are one of the following:
   $In_2O_3$ : $SnO_2$; $In_2O_3$; Mo, Pt, Pd; Rh; Ti; ZnSe.

9. Panel in accordance with claim 6 said polymer layer being either polyaniline; polyaniline-3-sulfonic acid; polypyrol; polythiophene or poly-O-phenyl diamine.

10. Panel in accordance with claim 6 said electrolyte being one of the following: a polymeric sulfonic acid; a polymeric carbonic acid; buffered $H_2SO_4$; HCl; buffered $H_2ClO_4$.

11. Panel in accordance with claim 6, said electrodes are one of the following:
$In_2O_3 : SnO_2$; $In_2O_3$; $In_2O_3$; Mo; Pt; Pd; Rh; Ti; ZnSe; said polymers are one of the following:
polyaniline; polyaniline-3-sulfonic acid; polypyrol; polythiophene or poly-O-phenyl diamine; and said electrolyte is one of the following:
a polymeric sulfonic acid; a polymeric carbonic acid; buffered $H_2SO_4$; HCl; buffered $H_2ClO_4$.

\* \* \* \* \*